(12) United States Patent
Tardivat et al.

(10) Patent No.: US 8,445,395 B2
(45) Date of Patent: May 21, 2013

(54) METHOD OF OBTAINING POROUS CERAMICS

(75) Inventors: Caroline Tardivat, Aix-en-Provence (FR); Emmanuel Mercier, Salon de Provence (FR); Christian His, Cavaillon (FR); Franceline Villermaux, Avignon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 755 days.

(21) Appl. No.: 11/658,405

(22) PCT Filed: Jul. 26, 2005

(86) PCT No.: PCT/FR2005/001941
§ 371 (c)(1),
(2), (4) Date: Nov. 14, 2008

(87) PCT Pub. No.: WO2006/018537
PCT Pub. Date: Feb. 23, 2006

(65) Prior Publication Data
US 2009/0069167 A1 Mar. 12, 2009

(30) Foreign Application Priority Data
Jul. 28, 2004 (FR) .................................... 04 08330

(51) Int. Cl.
*C04B 38/02* (2006.01)
(52) U.S. Cl.
USPC ............................................. 501/84; 501/80
(58) Field of Classification Search
USPC .................................................... 501/80, 84
See application file for complete search history.

(56) References Cited

U.S. PATENT DOCUMENTS

| 4,024,212 A | 5/1977 | Dore et al. |
| 5,643,512 A | 7/1997 | Daws et al. |

(Continued)

FOREIGN PATENT DOCUMENTS

| EP | 0 759 020 B1 | 3/1999 |
| EP | 1 140 731 B1 | 2/2003 |

(Continued)

OTHER PUBLICATIONS

Balkevich et al. "Rheological Properties of a Molding Mass for the Production of Mullite—Cordierite Ceramics". D. I. Mendeleev Moscow Chemical Engineering Institute. All-Union Institute of the Construction Industry. Translated from Steklo i Keramika, No. 11, pp. 27-29, Nov. 1978.*

(Continued)

*Primary Examiner* — Stuart Hendrickson
*Assistant Examiner* — Richard M Rump
(74) *Attorney, Agent, or Firm* — Young & Thompson

(57) ABSTRACT

A method of manufacturing a porous ceramic part, comprising the following steps in succession:
a) preparing a mixture M containing a ceramic powder in suspension, at least one gelling agent and at least one foaming agent, at a mixing temperature which is higher than the gelling temperature of the gelling agent;
b) shearing the mixture M at a foaming temperature which is higher than the gelling temperature, to obtain a foam;
c) gelling the foam by cooling the mixture M to a temperature below the gelling temperature of the gelling agent; and
d) drying the gelled foam to obtain a perform.
According to the invention, a stabilizing agent is added to the mixture M, which agent has an instantaneous viscosity, in Pa·s, that increases by a factor of at least ten when a shear rate of the stabilizing agent is reduced from 100 s$^{-1}$ to 0.

18 Claims, 2 Drawing Sheets

1 mm

U.S. PATENT DOCUMENTS

| | | |
|---|---|---|
| 5,705,448 A | 1/1998 | Sambrook et al. |
| 6,617,270 B1 | 9/2003 | Austin et al. |

FOREIGN PATENT DOCUMENTS

| | | |
|---|---|---|
| EP | 1329438 | 7/2003 |
| EP | 1329439 | 7/2003 |
| EP | 1359131 | 11/2003 |
| JP | 6293572 | 10/1994 |
| JP | 2001261463 | 9/2001 |
| JP | 2002265288 | 9/2002 |

OTHER PUBLICATIONS

English translation of Japanese Office Action dated Feb. 7, 2012 from JP2007-523116.

\* cited by examiner

METHOD OF OBTAINING POROUS CERAMICS

BACKGROUND OF THE INVENTION

The invention relates to a method of obtaining porous ceramics, and to the porous ceramics obtained.

Porous ceramics are known products characterized by a low density (5% to 50% of theoretical density). They may be constituted from the vast majority of ceramic powders, in particular alumina, silicon carbide etc.

SUMMARY OF THE INVENTION

A number of manufacturing methods exist for producing porous ceramic foams.

The simplest of those methods comprises adding a pore-forming agent to a ceramic slip or a mixture for pressing. It is formed, and then undergoes a firing cycle to burn off the pore-forming agent. On burning off, the pore-forming agent leaves pores. That method is described in European patent EP-B1-0 1 140 731, for example. It has the disadvantage of resulting in the release of gas (which may be toxic) due to pyrolysis of the pore-forming agent. Further, it is difficult to manufacture thick pieces since it is difficult to release the gas (the gas has to be able to be evacuated homogeneously).

A further technique is to replicate a polymer foam, for example polyurethane. The foam is coated with a ceramic slip. It is then fired to burn off the polyurethane foam and sinter the ceramic foam the structure of which is modeled on the starting polyurethane foam. By way of example, that method is described in U.S. Pat. No. 4,024,212. Difficulties arise linked to gas release (on burning off, the polyurethane releases dangerous gases containing C—N bonds). Further, it is difficult to produce parts with pores with dimensions of less than 200 μm [micrometers].

An alternative technique is to create pores by forming gases by a chemical reaction between various additives of a ceramic slip. By way of example, that method is described in U.S. Pat. Nos. 5,643,512 or 5,705,448. Here again, problems arise linked to gas release. Further, that technique must be combined with a foam consolidation technique.

One technique consists of mechanically introducing a gas into a slip by agitating. Here again, that method has to be combined with a foam consolidation technique.

Several other possibilities which exist for consolidating foam can be used to carry out the two techniques mentioned above.

A first solution consists in mixing polymerizable monomers with the ceramic slip. Under particular conditions, monomer polymerization causes the foam to consolidate. That method is described in EP-B1-0 759 020, for example. In contrast, the high cost of the monomers which can be used and problems with controlling the polymerization conditions have prevented that technique from being developed on an industrial scale.

A second solution consists in cross-linking the polymers in a ceramic slip. As with the above technique, said cross-linking causes the foam to consolidate. That method is described in EP-A-0 330 963, for example. In contrast, the high cost of the cross-linking agents which can be used, and problems with controlling the cross-linking conditions have prevented that technique from being developed on an industrial scale.

A more recent method of manufacturing porous ceramics is described in EP-A1-1 329 439. That method includes the following steps:

1) preparing a suspension of a ceramic powder in a dispersing agent;
2) preparing a solution containing a biogel, also termed a "hydrocolloid", and keeping the temperature above the gelling temperature of the solution;
3) mixing said suspension and said solution, adding a foaming agent to obtain a foam, the temperature being kept sufficiently high to prevent the biogel from gelling;
4) casting the foam into a mold;
5) cooling until the biogel gels;
6) drying, calcining and sintering the foam obtained.

Using a biogel to consolidate the foam can avoid the toxicity problems mentioned above. However, it turns out that if the foam cast into the mold is more than 60 mm [millimeters] thick, the foam does not have a structure that is homogeneous. Further, in that method, the quantity of water in the final mixture is large (45% to 50% by weight), which causes difficulties with drying, in particular for parts with large dimensions. Thus, it is not possible to manufacture porous ceramic parts with a homogeneous structure with such dimensions.

Thus, there exists a need for a method of manufacturing porous ceramic foam parts with a homogeneous density having dimensions of 60 mm or more.

To this end, the invention proposes a method of manufacturing a porous ceramic part comprising the following steps in succession:

a) preparing a mixture M containing a ceramic powder in suspension, at least one gelling agent and at least one foaming agent, at a mixing temperature that is higher than the gelling temperature of said gelling agent;

b) shearing said mixture M at a foaming temperature that is higher than said gelling temperature to obtain a foam;

c) gelling said foam by cooling said mixture M to a temperature below the gelling temperature of said gelling agent; and d) drying said gelled foam to obtain a preform.

According to the invention, a stabilizing agent is added to the mixture M, which agent has an instantaneous viscosity, in Pa·s [Pascal·second], that increases by a factor of at least ten when the shear rate of said stabilizing agent is reduced from 100 per second ($s^{-1}$) to 0.

The inventors have observed that subsidence of the foam when carrying out the method of EP-A1-1 329 439 occurs during a critical period between the end of the shear step and the onset of gelling. During that period, the gelling agent makes no substantial contribution to structural stabilization of the foam which, at thicknesses of more than 60 mm, collapses under its own weight. Once they had identified the cause of the subsidence, they proposed, in accordance with the invention, adding a stabilizing agent to the mixture. The stabilizing agent is selected for its capacity to considerably increase the viscosity of the mixture as soon as shearing of the mixture ceases, to stiffen the foam sufficiently to prevent it from collapsing until the gelling agent gels and can exert its stabilization function. It thus becomes possible to manufacture parts from a porous ceramic foam, with density that is homogeneous, having dimensions of 60 mm or more, and/or with complex shapes (cones or hollow cylinders, hemispheres, etc).

After step d), the method of the invention may include an additional step e) for sintering said preform to obtain a porous ceramic foam. Preferably, the sintering temperature and all of the organic components used are selected so that all of said organic components are burned off during sintering.

Preferably, the method of the invention also has one or more of the following optional characteristics:

the instantaneous viscosity of said stabilizing agent, in Pa·s, increases by a factor of at least one hundred when the shear rate of said stabilizing agent is reduced from 100 s$^{-1}$ to 0. Advantageously, the effect on stabilization of the foam is enhanced, which allows porous parts with thicknesses of more than 90 mm to be manufactured;

the change in viscosity of said stabilizing agent as a function of the shear rate of said stabilizing agent is substantially reversible. Hence, when the shear rate of mixture M increases, the influence of the stabilizing agent on the viscosity of the mixture reduces, and may even become negligible. Advantageously, the presence of stabilizing agent thus does not result in a major increase in energy requirement;

in step a), said mixture M is prepared from a ceramic slip A, a pre-mixture B containing at least one gelling agent and a stabilizing agent and a pre-mixture C containing at least one foaming agent;

said stabilizing agent is selected so that, at the end of step c), the viscosity of said foam is greater than 1000 Pa·s at 20° C. Preferably, said stabilizing agent is a hydrocolloid, preferably of vegetable origin, more preferably selected from the group formed by xanthan and carrageenan or a mixture thereof. The preferred stabilizing agent is xanthan. Advantageously, the hydrocolloids of vegetable origin are eliminated during the step of high temperature firing treatment of the preform, which produces a high purity sintered part;

the amount of said stabilizing agent in said mixture M is in the range 0.05% to 5% by weight, preferably in the range 0.1% to 1% by weight;

said mixture M has a water content of less than 40%, preferably less than 30%, as a percentage by weight;

said gelling agent is a hydrocolloid of animal or vegetable origin that can gel said composition thermoreversibly following foaming. Preferably, said gelling agent is gelatin. Advantageously, the gelling agent is eliminated during the step of sintering of the preform, which produces a high purity sintered part. More preferably, the amount of gelling agent in the mixture M is in the range 1% to 10%, preferably in the range 1% to 6% by weight;

In step a), a plasticizing agent is preferably added to said mixture M in a quantity by weight in the range multiplying that of said gelling agent by 0.25 to 1. Also preferably, the plasticizing agent is selected so that it burns off at a temperature that is higher than the evaporation temperature of the liquid serving in step a) to take the ceramic powder into suspension, generally water.

The invention also pertains to a porous ceramic obtained by the method of the invention. Said ceramic has a density after sintering in the range 8% to 50% of the theoretical density of the material constituting said foam, i.e. a total porosity in the range 50% to 92%.

Preferably, said porous ceramic also has one or more of the following characteristics:

the size of the cellular pores of said foam is between 10 μm and 2000 μm;

more than 15% by number of the cellular pores are greater than 300 μm in size;

fewer than 10% by number of the cellular pores are less than 10 μm in size, 20% to 85% of the cellular pores have a size of less than 300 μm and 4% to 40% of the cellular pores have a size of more than 450 μm, the percentages being percentages by number;

said porous ceramic foam has fewer than 1500, preferably fewer than 1000, more preferably fewer than 700 cellular pores per dm$^2$ [square decimeter] at its surface;

said porous ceramic foam has a thickness of more than 60 mm.

Finally, the invention provides the use of a porous ceramic manufactured by means of a method of the invention for thermal insulation, in particular in furnaces (especially when the foams are formed from alumina or zirconia, preferably zirconia which is known to have low heat radiation), for catalysis supports, for the filtration of hot gases or liquids (in particular when the foams are formed from cordierite or silicon carbide), as a diffuser (heated part allowing the air/gas mixture required for combustion to pass through) in a gas burner, or as a flame check (safety device which stops flames by means of its small pore size), in a solar volumetric receiver, in sandwich products (in particular for acoustic insulation), or as a flexible seal.

BRIEF DESCRIPTION OF THE DRAWINGS

Other characteristics and advantages of the present invention become apparent from the following description and accompanying drawings in which.

DETAILED DESCRIPTION OF THE INVENTION

Figure 1:
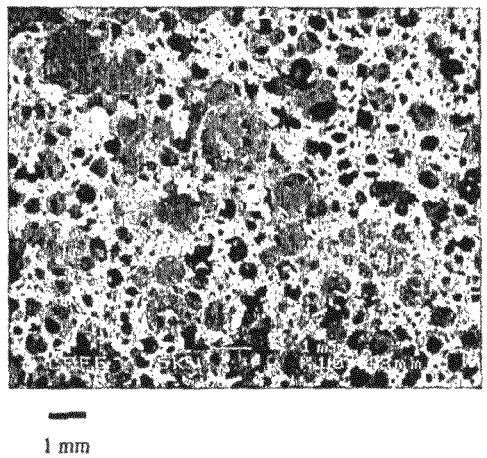
FIGS. 1 to 4 show, at different magnifications, scanning electron microscope images of samples taken 10 mm to 20 mm from the surface of sintered parts manufactured using a method in accordance with the invention.
Figure 2:
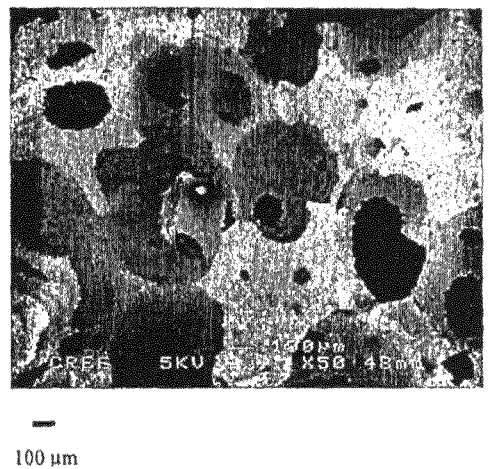
Figure 3:
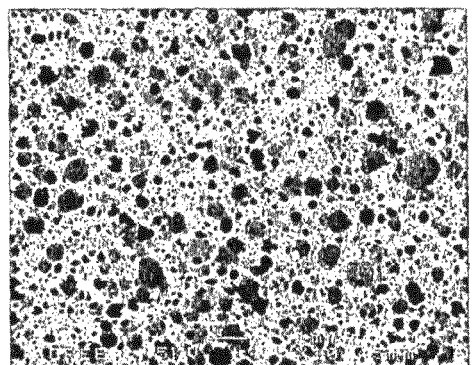
Figure 4:
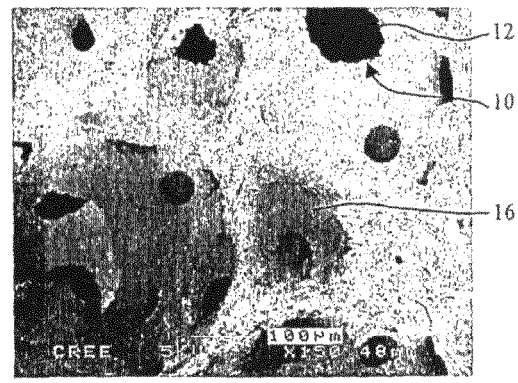

In the various figures, identical reference numerals are used to designate identical or analogous features.

The maximum dimension of a pore is termed the "pore size". In products of the invention, the pores have a quasi-spherical shape so the size is the diameter. The pore size is measured by analyzing images of the surface of sintered foams.

In the first step a) of this manufacturing method, a mixture is prepared containing a ceramic powder in suspension, preferably in water, at least one gelling agent, at least one foaming agent and, in accordance with the invention, at least one stabilizing agent.

Preferably, the following procedure is followed.

Firstly, the following is prepared:

a slip A, by dispersing ceramic powder and a dispersing agent in water using a conventional technique;

a pre-mixture B, by dissolving gelling and stabilizing agents in water at a temperature which is higher than the gelling temperature of the gelling agent;

a pre-mixture C, by dissolving a foaming agent in water.

The quantity of ceramic powder in the slip A is preferably in the range 50% to 90% by weight, more preferably in the range 70% to 85% by weight of the slip A. Preferably, the mixture M contains 50% to 80%, preferably 60% to 70% by weight of ceramic particles.

The dispersing agent, for example a polyacrylate type surfactant, is selected to be effective at the mixing temperature.

The gelling agent is preferably a hydrocolloid of animal or vegetable origin which can gel said composition thermoreversibly after foaming, for example gelatin, carrageenan, or a mixture thereof.

Any stabilizing agent may be used provided that it has the property of having a viscosity that increases by a factor of at least ten when the shear rate gradient reduces from 100 s$^{-1}$ to 0. Preferably, the stabilizing agent is selected so that the viscosity of the mixture M during shear barely increases due to its incorporation into this mixture.

Advantageously, it is thus possible to use mixers employed in the prior art without having to resort to increasing the water content of the mixture. Increasing the amount of water would cause problems for subsequent drying.

Preferably, the stabilizing agent is selected so that it is reversible. Also preferably, the stabilizing agent and gelling agent are selected so that:
- the viscosity of the gelled foam is greater than or equal to that of a gelled foam obtained from a mixture identical to mixture M but that does not contain a stabilizing agent; and
- the viscosity of the foam obtained between steps b) and c) (before gelling and after the foaming operation is complete) is greater than or equal to that of a gelled foam obtained from a mixture that is identical to mixture M but that does not contain a gelling agent.

Preferably, the stabilizing agent and gelling agent are selected so that they substantially do not interact with each other. Associations of gelatin in the one hand, and of xanthan and/or carrageenan, preferably xanthan alone, are especially preferred.

Xanthan and carrageenan are physical gels, i.e. have a reversible network structure in which bonds are formed by physical interaction (crystallization, helix formation, vitrification, etc). As an example, the xanthan molecule forms into a single, double, or triple helix which interacts with other molecules to form a complex network. In solution in water, aggregates are formed with weak bonds. Said aggregates may be dissociated by shearing.

Preferably, at least one plasticizing agent, preferably in liquid form at the temperature at which the mixture M is prepared, preferably a polyol, more preferably glycerol, is added to the pre-mixture B. The plasticizing agent is selected to have good compatibility with the gelling agent, i.e. a capacity to remain in the mixture M and thus to resist migration and solvents, without causing phase separation. Preferably, the amount of plasticizing agent is in the range multiplying that of the gelling agent by 0.25 to 1.

The foaming agent, preferably a soap, is preferably added to the pre-mixture C in a proportion in the range 55% to 75% by weight of said pre-mixture. Preferably again, the quantity of foaming agent is determined so that its quantity in the mixture M is in the range 1% to 3% by weight.

The mixture M may also contain one or more thermoplastic binders as normally used in ceramics.

The slip A and the pre-mixture C are then added to the pre-mixture B with mechanical stirring, the temperature, termed the "mixing temperature", being kept above the gelling temperature of the gelling agent. Preferably, pre-mixtures A, B, and C are mixed immediately after preparing them to form the mixture M. The stabilizing agent produces aqueous solutions with a viscosity that is stable in the temperature range used.

The pH of the pre-mixture B may be acidic, basic, or neutral, and is preferably selected to allow good dispersion with the pre-mixture A.

In step b), the mixture M is sheared to foam it. The shear may result from mechanical agitation, blowing gas, or by any combination of those two techniques. When blowing gas, it is preferable to use a membrane provided with calibrated holes.

During said step b), if the viscosity of the stabilizing agent is reversible under the effect of shear, shear reduces the viscosity of the mixture.

Step b) is carried out at a temperature that is higher than the gelling temperature of the gelling agent, for example at the mixing temperature.

After producing the ceramic foam, the shearing is stopped then, optionally, the foam is cast into a mold.

The presence of stabilizing agent immediately increases the viscosity of the mixture because shearing has ceased. The stabilizing agent thus stiffens the foam structure even though the temperature remains higher than the gelling temperature. Any subsidence in the foam onto itself before the gelling step is thus avoided and it becomes possible to manufacture stable foams with a thickness of more than 60 nm, or even more than 80 mm.

In step c), the foam is cooled or allowed to cool to a temperature below the gelling temperature of the gelling agent, preferably to ambient temperature (10-25° C.). Gelling advantageously produces a gelled foam that is sufficiently rigid to be manipulated without degrading. The method is thus well suited to industrial use.

The gelled foam is then dried at ambient temperature and preferably placed in an furnace at a temperature of 100° C. to 120° C. to obtain a preform which may be sintered. The preform or biscuit may advantageously be up to 80 mm thick, or even 150 mm thick. Next, the preform is calcined at 1300° C. to 1700° C. More precisely, the preform is then calcined in air at its sintering temperature, namely 1200° C. to 1500° C. for cordierite and 1400° C. to 1800° C. (2300° C. if possible) for alumina, mullite, or zirconia, or for silicon carbide.

After placing in the furnace and before or after firing by high temperature treatment, the foam may be machined to obtain a part with the desired dimensions.

The porous ceramic obtained by sintering the preform is a foam with an open, interconnected structure. It advantageously has a density after firing in the range 8% to 50% of the theoretical density of the material (equal to 4 grams per cubic centimeter for alumina, for example, i.e. 50% to 92% porosity. The cellular pore size is generally between 10 μm and 2000 μm, as can be seen in FIGS. 1 to 4.

The foam has a plurality of cells 10 connected to other adjacent cells via windows 12. A cell at the surface of the porous ceramic foam also has one or more openings 16 which open to the outside. The term "interconnecting porosity" is used to define the porosity created by the interconnecting windows 12 between the cells and by the openings 16 of the superficial cells.

Figure 5:
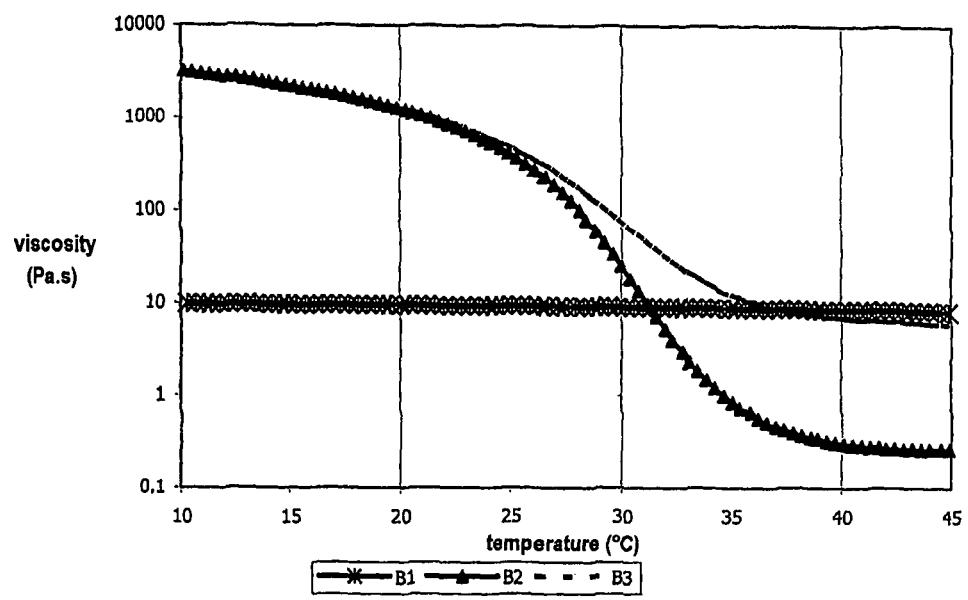
FIGS. 5 and 6 are graphs showing the rheological behavior of various pre-mixtures B.
Figure 6:
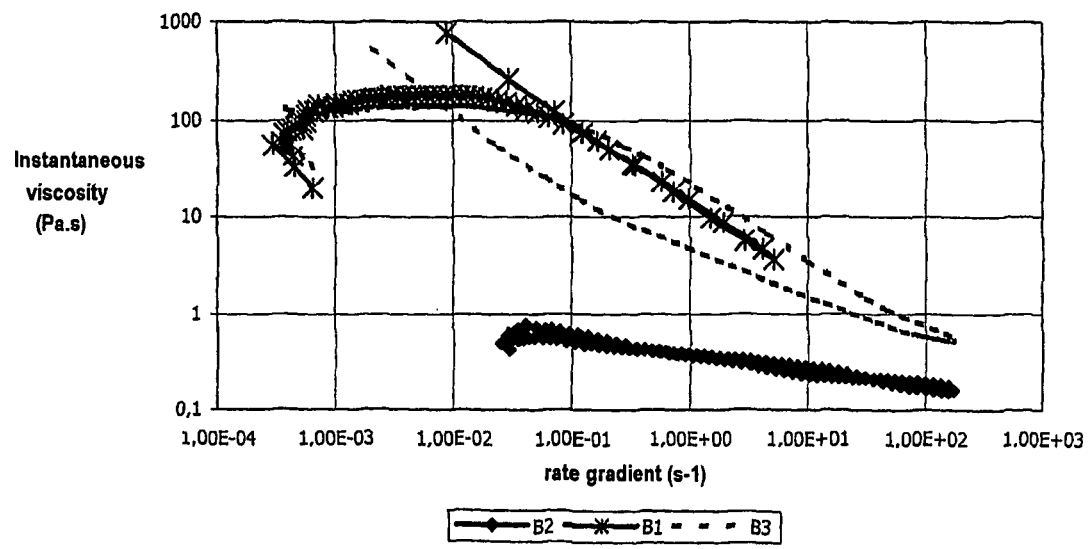

Reference is made to FIGS. 5 and 6.

FIG. 5 shows the change in viscosity of three pre-mixtures B1, B2 and B3, provided by way of example.
- B1 contains 87% water, 7.4% glycerin, 4.8% polyvinyl alcohol and 0.8% xanthan;
- B2 contains 77.3% water, 6.5% glycerin, 4.2% polyvinyl alcohol and 12% gelatin;
- B3 contains 76.7% water, 6.5% glycerin, 4.2% polyvinyl alcohol, 11.9% gelatin and 0.7% xanthan.

Said pre-mixtures were prepared at 80° C. and then kept at 40° C. for 3 hours. The viscosity of these mixtures, which were allowed to stand, was then measured as a function of their temperature, reducing the temperature by 1° C. per minute from 45° C. (close to the temperature at which the mixture M has produced) to 10° C. The measurement was made using a Bohlin® CVO 120 viscometer with cone/plate geometry (diameter 40 mm, angle 4°) oscillating at 1 hertz with a deformation of 0.01. The results of test A are shown in FIG. 5.

FIG. 5 shows that xanthan alone (curve B1) could not vary the viscosity of the mixture as a function of temperature. Thus, xanthan is not a thermoreversible gel, unlike gelatin (curve B2). Thus, xanthan does not appear to be suitable for varying the viscosity of a ceramic mixture as a function of temperature. Thus, in particular, it appears to be unsuitable for gelling a ceramic foam during cooling thereof.

FIG. 5 also shows that xanthan cannot by itself produce a high viscosity which is capable of coagulating a ceramic foam. In contrast, gelatin can produce satisfactory viscosities at ambient temperature (10° C. to 25° C.) which are between 200 and 500 times higher than those obtained with xanthan alone.

Finally, FIG. 5 shows that the presence of xanthan does not retard the gelling action of the gelatin, the effect of the xanthan being negligible at temperatures below 25° C. The association of xanthan and gelatin appears to have substantially no technical effect at temperatures below 25° C. and thus would only appear to increase the manufacturing costs.

In FIG. 6, the instantaneous viscosities of B1, B2 and B3 at 45° C. are shown as a function of this rate gradient (or "shear rate"). To obtain the results shown in FIG. 6, the shear rate was increased, then kept steady for 1 minute, then the shear rate was decreased. During the entire test period, carried out at a temperature of 45° C. (close to the temperature at which mixture M was produced), the change in viscosity was measured. The measurements were carried out with a Bohlin® CVO 120 viscometer with cone/plate geometry (diameter 40 mm, angle 4°) in rotation mode.

It was observed that in the absence of xanthan, the viscosity of the gelatin did not change or hardly changed as a function of the shear rate. In contrast, the instantaneous viscosity of the mixture of gelatin and xanthan, like that of xanthan alone, reduced very substantially when the shear rate increased and reached very high values when the shear reduced, even for low amounts of xanthan.

The inventors have also shown that an increase or reduction in the viscosity of the product (gelatin, xanthan or a mixture of xanthan and gelatin), following a change in temperature or shear rate, under the same temperature and shear conditions, results in an improvement or deterioration respectively in the structural behavior of the foam obtained by shear of a refractory composition incorporating said product.

At the end of the shear step b), the mixture of gelatin and xanthan incorporated into the mixture M then results, as can be seen in FIG. 6, in an immediate improvement in the structural behavior of the foam in proportions which are vastly superior to that which gelatin alone could produce. The foam is thus sufficiently rigid not to collapse upon itself. It is easy to handle. Finally, the action of a mixture of xanthan and gelatin avoids modifying the structure (coalescence of air bubbles, segregation of ceramic powder, etc) which could result in heterogeneity of the product and fragilization.

The temperature of the foam then drops progressively which, as can be seen in FIG. 5, further increases the structural strength of the foam in proportions which are vastly superior to that which xanthan alone could produce. The foam is then sufficiently rigid to be able to be manipulated under industrial conditions without deteriorating.

The actions of gelatin and xanthan are thus wholly complementary as regards carrying out the method of the invention, in particular for the manufacture of parts with large dimensions.

The following non-limiting examples are provided in order to illustrate the invention.

In the examples, the starting materials employed were selected from:

reactive $Al_2O_3$ or a mixture of reactive aluminas containing more than 99% of $Al_2O_3$, the median diameter being from 0.1 μm to 200 μm;

zirconia containing more than 99% of $ZrO_2$, with a median diameter of 0.1 μm to 200 μm;

Prox® BO₃ dispersing agent based on ammonium polyacrylate, sold by Synthron;

GPA A0 gelatin, sold by Wesardt international;

Satiaxane™ CX90T, xanthan gum produced and sold by SKW Biosystems;

RHODOVIOL® 4/125, a polyvinyl alcohol with a low degree of hydrolysis (88 mol %) sold by Rhodia PPMC;

glycerin sold by Moulet Peinture (Avignon, France);

Schäumungsmittel W53FL, an ammonium polyacrylate-based dispersing agent sold by Zschimmer and Schwarz GmbH;

cordierite with a median diameter of about 4 μm and containing 54% of $SiO_2$, 29% of $Al_2O_3$, 13% of MgO, and less than 2.5% of $Fe_2O_3+TiO_2$;

mullite with a median diameter of about 9 μm and containing 26% of $SiO_2$, 73% of $Al_2O_3$, 13% of MgO, and less than 2.5% of $Fe_2O_3+TiO_2$;

In all of the examples below, the dispersing agent was Prox® BO3, the foaming agent was always W53FL, the plasticizer was glycerin and the hardener was RHODOVIOL® 4/125.

The slip A was produced by dispersing ceramic powder and dispersing agent in water. The ceramic powder was alumina ($Al_2O_3$) for examples 1 to 16 and 19, mullite ($Al_2O_3$—$SiO_2$) for example 17, a mixture of 80% cordierite and 20% mullite for example 18, a mixture of 80% alumina and 20% zirconia for example 20.

The pre-mixture B was produced in a water bath at 55° C. by dissolving gelatin GPA A0 and possibly xanthan, glycerin, and hardening agent it in water.

The pre-mixture C was produced by dissolving two thirds (by weight) of foaming agent dissolved in one third of the water.

A and C were added to B in a water bath at 55° C. with constant mechanical agitation for 20 minutes. The proportions of constituents A, B and C in the final mixture M, without ceramic powder, are given in Table 1. The foam obtained was cast into a mold at ambient temperature, at less than 25° C. The dimensions of the mold were 300 mm×300 mm×45 mm except for example 19, where the mold was 80 mm deep (identical section: 300 mm×300 mm). It was dried for 24 hours at ambient temperature then for 24 hours at 35° C. with forced ventilation to obtain a preform.

This preform was then sintered in air for 4 hours at 1600° C. except for examples 1 and 2 for which the preform obtained was too friable to undergo a sintering cycle.

It should be noted that during the high temperature firing treatment the dimensional shrinkage, of the order of 15% to 20%, was substantially the same in all directions.

Some characteristics of the ceramic foams obtained are shown in Tables 1 and 2.

TABLE 1

| | Dispersing agent | Gelatin | Xanthan | Foaming agent | Water | Glycerin | Hardener | Density g/cm³ | Coagulation after casting | Cracks after drying | Mechanical strength mPa |
|---|---|---|---|---|---|---|---|---|---|---|---|
| | | | | % by weight in mixture M (1) | | | | | | | |
| 1 | 0.6 | 5.3 | / | 2.2 | 27.9 | / | / | | N | | |
| 2 | 0.6 | 5.2 | / | 2.1 | 29.9 | / | / | | N | | |
| 3 | 0.6 | 3.1 | 0.1 | 2.2 | 28.6 | / | / | 0.57 | Y | Y | 2.3 |
| 4 | 0.7 | 1.8 | 0.2 | 2.2 | 28.9 | / | / | 0.48 | Y | Y | |
| 5 | 0.7 | 1.0 | 0.2 | 2.2 | 29.2 | / | / | 0.47 | Y | Y | |
| 6 | 0.7 | 1.8 | 0.1 | 2.2 | 28.7 | 1.0 | / | 0.50 | Y | N | |
| 7 | 0.6 | 3.1 | 0.1 | 2.2 | 28.3 | 1.0 | / | 0.50 | Y | N | |
| 8 | 0.6 | 2.4 | 0.1 | 2.2 | 28.5 | 1.0 | / | 0.52 | Y | N | |
| 9 | 0.7 | 1.8 | 0.1 | 2.2 | 28.7 | 1.0 | / | 0.50 | Y | N | |
| 10 | 0.6 | 2.4 | 0.1 | 2.2 | 28.4 | 1.0 | 0.3 | 0.53 | Y | N | |
| 11 | 0.6 | 2.4 | 0.1 | 2.2 | 28.4 | 1.0 | 0.1 | 0.54 | Y | N | |
| 12 | 0.6 | 1.8 | 0.1 | 2.2 | 29.0 | 1.0 | 0.6 | 0.50 | Y | N | |
| 13 | 0.6 | 1.8 | 0.1 | 2.2 | 28.5 | 1.0 | 0.6 | 0.47 | Y | N | |
| 14 | 0.6 | 1.8 | 0.1 | 2.2 | 28.3 | 1.0 | 0.6 | 0.94 | Y | N | |
| 15 | 0.6 | 1.8 | 0.1 | 2.2 | 28.5 | 1.0 | 0.6 | 0.69 | Y | N | 4.2 |
| 16 | 0.6 | 1.8 | 0.1 | 2.2 | 28.3 | 1.0 | 0.6 | 1.08 | Y | N | 9.3 |
| 17 | 0.6 | 1.8 | 0.1 | 1.6 | 28.5 | 1.0 | 0.6 | 0.50 | Y | N | |
| 18 | 0.6 | 1.7 | 0.1 | 1.5 | 33.1 | 0.9 | 0.6 | 0.44 | Y | N | 2.2 |
| 19 | 0.6 | 1.8 | 0.1 | 1.6 | 28.3 | 1.0 | 0.6 | 1.00 | Y | N | 6.5 |
| 20 | 0.6 | 1.8 | 0.05 | 2.2 | 28.5 | 1.0 | 0.6 | 0.55 | Y | N | |

(1) The complement was constituted by ceramic powder.

After casting, occasional immediate coagulation could be observed as soon as agitation and/or manipulation (casting into a mold) ceased. The term "coagulation" means the height of the cast part does not reduce and/or vary, depending on the zones of the cast part. In the Table, "Y" means that coagulation was observed and "N" means that the structure of the cast foam changes after molding (no coagulation).

Finally, for certain foams the presence of several cracks was observed in the dry parts. The presence of cracks is indicated by a "Y" in Table 1, while "N" indicates that no cracks were observed. These cracks were principally located on the edges of the parts and were from a few mm to several cm [centimeters] in length. These cracks were not critical and could be eliminated by machining. However, they are annoying.

The density was measured using a conventional geometrical method and expressed in grams per cubic centimeter.

The results shown in Table 1 demonstrate the advantage of adding a stabilizing agent which can coagulate the structure obtained by mechanical foaming. Homogeneous parts with the desired dimensions were thus obtained.

The plasticizing agent could produce more flexible parts where drying did not induce the formation of cracks. Further, and preferably, as applied here, the plasticizing agent burns off at a temperature that is much higher than the water evaporation temperature. Thus, this compound fulfills its role even with the dried part and, during sintering, allows a certain degree of moisture to be retained in the part and thus avoids firing too fast which would give a "crust" effect on the final product. This favorable effect is particularly useful in the manufacture of parts with large dimensions.

TABLE 2

| | 12 | 14 | 15 | 18 |
|---|---|---|---|---|
| Density (g/cm³) | 0.5 | 0.94 | 0.69 | 0.44 |
| Porosity (%) | 87.5 | 76.5 | 82.7 | 81.9 |
| Number of cellular pores per dm² | 598 | 1397 | 607 | 917 |
| Number of cellular pores more than 300 μm in size (%) | 30 | 18 | 30 | 42 |
| Number of cellular pores more than 450 μm in size (%) | 20 | 5 | 17 | 25 |
| Number of cellular pores more than 750 μm in size (%) | 6 | 0 | 5 | 6 |
| Number of cellular pores less than 100 μm in size (%) | 47 | 49 | 46 | 23 |
| Pressure drop for air flow of 22 m³/h (mbar) | 0.93 | 13.5 | | 0.91 |

The porosity of the products as can be seen, for example, in FIGS. 1-4 and as characterized in Table 2, shows cellular pores with a size of 10 μm to 2000 μm.

As described above, the structure is formed from interleaved cells defined by ceramic walls which are connected together via windows.

Surprisingly, the inventors have observed that the method of the invention provides the foam with a particular microstructure.

Firstly, the cellular pore size is distributed in a relatively homogeneous manner between 10 μm and 2000 μm; less than 10% of the cellular pores have a diameter of less than 10 μm; 20% to 85% of the cellular pores have a diameter of less than 300 μm and 4% to 40% of the cellular pores have a diameter of more than 450 μm.

These inventive foams are also distinguished from currently known foams by a very extensive range of cellular pore sizes, the absence of a dominant cellular pore size and a smaller number of cellular pores per unit surface area. In general, this is less than 1500 cellular pores per dm².

Further, it can be seen that, when the density reduces, the porosity increases by increasing the size of the cellular pores while their number reduces. More than 15% of cellular pores, and sometimes at least 30% of cellular pores, have a diameter of more than 300 μm.

In contrast, current ceramic foams have a pore size which varies little as a function of density and is generally less than 300 μm for 90% of pores; the reduction in density is thus accompanied by an increase in the number of pores.

The novel manufacturing method of the invention can thus be used to manufacture ceramic foams the structure of which is novel and provides several advantages.

The presence of large cellular pores can also produce products with a very low pressure drop which is of particular advantage in certain applications, for example for gas filtration.

Said foams are also remarkable in that they are extremely pure chemically. Said purity is linked to the purity of the ceramic starting materials used, since all of the organic components used are burned off during firing by the high temperature treatment.

The products of Examples 12 and 14 have been characterized to determine the advantage of using them as an insulator. These products were compared with R134 insulating refractory bricks sold by Saint-Gobain Ceramics and with ALTRA®KVS refractory fiber panels sold by Rath Performance Fibers.

The results are shown in Table 3. The subsidence temperature corresponds to the temperature at which a cylindrical sample subsides by 2% of its initial height when it is subjected to a pressure of 2 bars.

TABLE 3

|  | 12 | 14 | R134 | KVS |
|---|---|---|---|---|
| Chemical analysis: $Al_2O_3$ (%) | 99.8 | 99.9 | 99.0 | 85.0 |
| Density (g/cm³) | 0.5 | 0.94 | 1.6 | 0.7 |
| Porosity (%) | 87.5 | 76.5 | 60 | — |
| Mean cellular pore size (μm) | 10-1000 | 2-500 | — | — |
| Modulus at break at 20° C., 3 point bending (MPa) | 2-2.5 | 12-15 | 10.5 | 1 |
| Crush strength at 20° C. (MPa) | 3-5 | 20-30 | 34 | 0.8 |
| Subsidence temperature | 1540° C. | >1730° C. | >1730° C. | 1175° C. |
| Thermal conductivity (W/m · K) at 20° C. | 0.60 | 3.7 | — | — |
| at 400° C. | 0.45 | 2.0 | 1.7 | 0.28 |
| at 800° C. | 0.47 | 1.4 | 1.3 | 0.31 |
| at 1000° C. | 0.53 | 1.2 | 1.25 | 0.33 |
| at 1200° C. | — | 1.1 | — | 0.38 |

It can be seen that the products of the invention, in particular those with a density close to 1, have sufficient mechanical strength to constitute construction items such as the traditional refractory bricks used for insulating walls.

It can be seen that the products of the invention have an insulating power, in particular at high temperatures, which is higher than traditional refractory bricks and of the same order as the fiber panels.

Advantageously, the products of the invention do not suffer from the hygiene problems mentioned for certain fiber panels.

Clearly, the present invention is not limited to the implementations described and shown in the illustrative and non-limiting examples.

The invention claimed is:

1. A method of manufacturing a porous ceramic part, comprising the following steps in succession:
   a) preparing a mixture M containing a ceramic powder in suspension, at least one gelling agent and at least one foaming agent, at a mixing temperature which is higher than a gelling temperature of said gelling agent;
   b) shearing said mixture M at a foaming temperature which is higher than said gelling temperature, to obtain a foam, the gelling agent being selected to make no substantial contribution to structural stabilization of said foam at said foaming temperature;
   c) gelling said foam by cooling said mixture M to a temperature below the gelling temperature of said gelling agent; and
   d) drying said gelled foam to obtain a preform;
   wherein a stabilizing agent is added to said mixture M, which agent has an instantaneous viscosity, in Pa·s, that increases by a factor of at least ten when a shear rate of said stabilizing agent is reduced from 100 $s^{-1}$ to 0.

2. The method according to claim 1, wherein the instantaneous viscosity of said stabilizing agent, in Pa·s, increases by a factor of at least a hundred when the shear rate of said stabilizing agent is reduced from 100 $s^{-1}$ to 0.

3. The method according to claim 1, wherein the change in viscosity of said stabilizing agent as a function of the shear rate of said stabilizing agent is substantially reversible.

4. The method according to claim 1, wherein in step a), said mixture M is prepared from a ceramic slip A, a pre-mixture B containing at least one gelling agent and a stabilizing agent and a pre-mixture C containing at least one foaming agent.

5. The method according to claim 1, wherein said stabilizing agent is selected from the group formed by xanthan and carrageenan or a mixture thereof.

6. The method according to claim 1, wherein the amount of said stabilizing agent in said mixture M is in the range 0.05% to 5% by weight.

7. The method according to claim 1, wherein the amount of said stabilizing agent in said mixture M is in the range 0.1% to 1% by weight.

8. The method according to claim 1, wherein said mixture M has a water content of less than 40% as a percentage by weight.

9. The method according to claim 8, wherein said mixture M has a water content of less than 30% as a percentage by weight.

10. The method according to claim 1, wherein said gelling agent is a hydrocolloid of animal or vegetable origin which can thermoreversibly gel said composition following foaming.

11. The method according to claim 1, wherein said gelling agent is gelatin and said stabilizing agent is a hydrocolloid selected from the group consisting of xanthan, carrageenan and a mixture thereof.

12. The method according to claim 1, wherein an amount of gelling agent in the mixture M is in a range 1% to 10%, by weight, and an amount of said stabilizing agent in said mixture M is in a range 0.05% to 5% by weight.

13. The method according to claim 1, wherein in step a), a plasticizing agent is added to said mixture M in a quantity by weight in a range multiplying that of said gelling agent by 0.25 to 1.

14. The method according to claim 1, comprising an additional step e) for sintering said preform.

15. The method according to claim 1, wherein the gelled foam is dried at a temperature of 100° C. to 120° C.

16. The method according to claim 1, wherein the stabilizing agent and gelling agent are selected so that a viscosity of the gelled foam is greater than or equal to that of a gelled foam obtained from a mixture identical to mixture M but that does not contain the stabilizing agent 17. The method according to claim 1, wherein said foam has a thickness of more than 60 mm.

18. The method according to claim 1, wherein said foam has a thickness of more than 80 mm.

* * * * *

UNITED STATES PATENT AND TRADEMARK OFFICE
CERTIFICATE OF CORRECTION

PATENT NO. : 8,445,395 B2
APPLICATION NO. : 11/658405
DATED : May 21, 2013
INVENTOR(S) : Tardivat et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this

Eighth Day of September, 2015

Michelle K. Lee
*Director of the United States Patent and Trademark Office*